United States Patent [19]
Clark

[11] 3,737,043
[45] June 5, 1973

[54] MEMBRANE MODULE
[75] Inventor: George B. Clark, Waukesha, Wis.
[73] Assignee: Aqua-Chem, Inc., Midland, Mich.
[22] Filed: June 12, 1972
[21] Appl. No.: 262,124

Related U.S. Application Data
[63] Continuation-in-part of Ser. No. 97,136, Dec. 11, 1970, abandoned, which is a continuation-in-part of Ser. No. 781,892, Dec. 6, 1968, abandoned.

[52] U.S. Cl. ................210/321, 210/488, 210/492, 210/496
[51] Int. Cl. .............................................B01d 13/00
[58] Field of Search......................210/22, 23, 321, 210/345–347, 483, 488, 492, 496

[56] References Cited
UNITED STATES PATENTS
3,417,870   12/1968   Bray.....................................210/321
2,452,407   10/1948   Walker..............................210/488 X Primary Examiner—Samih N. Zaharna
Assistant Examiner—Richard Barnes
Attorney—H. L. Aamoth, Richard G. Waterman and Albin R. Lindstrom

[57] ABSTRACT

A compact membrane module for use in reverse osmosis processes having a plurality of membrane cell structures located in close adjacency so that when the module is in use, adjacent membrane structures tend to support each other against the high pressures customarily encountered in reverse osmosis processes thereby minimizing the amount of high pressure resistant material required.

20 Claims, 11 Drawing Figures

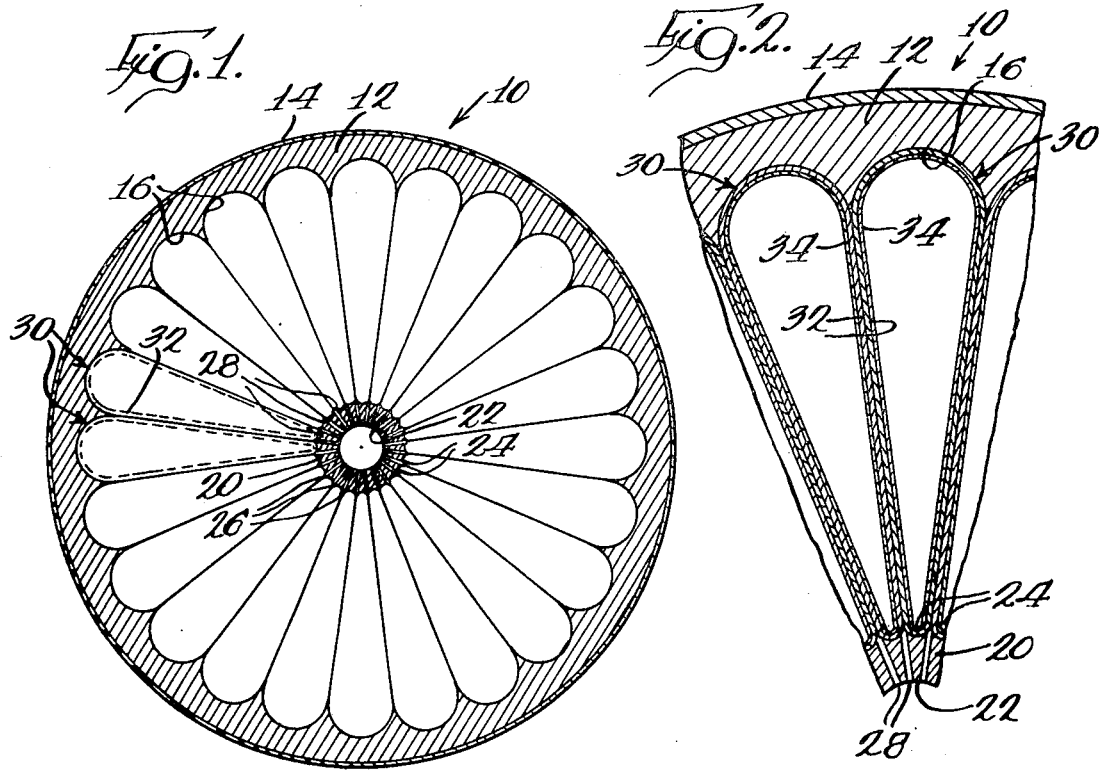
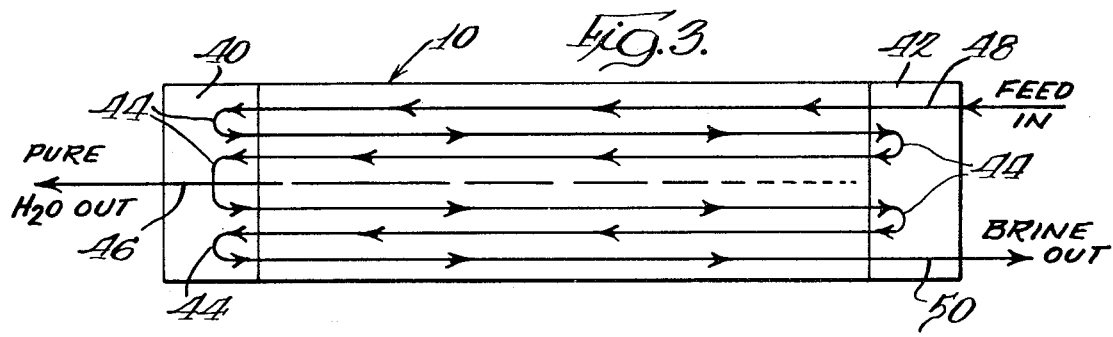
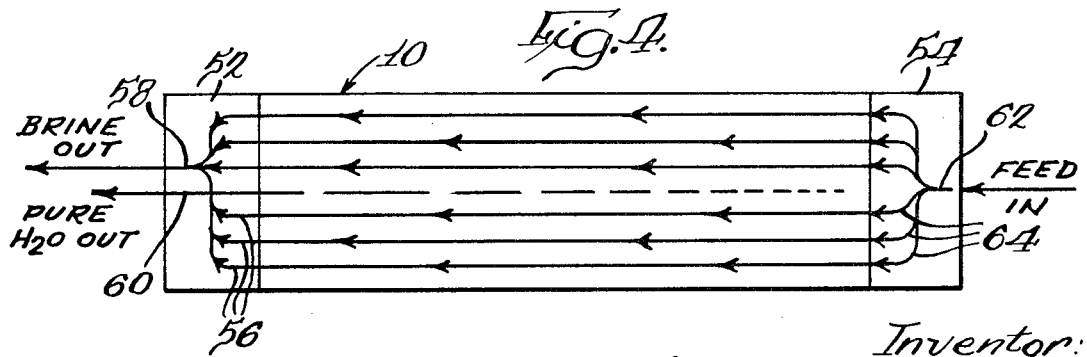

PATENTED JUN 5 1973

MEMBRANE MODULE

CROSS-REFERENCE TO RELATED APPLICATIONS

This application is a continuation-in-part of my co-pending application Ser. No. 97,136, filed Dec. 11, 1970, and now abandoned, entitled "Membrane Module," which in turn is a continuation-in-part of my co-pending applications Ser. No. 781,892 filed Dec. 6, 1968, and now abandoned, entitled "Membrane Module."

BACKGROUND OF THE INVENTION

Because of the ever increasing water shortage problem, considerable effort has been expended to develop economical methods and apparatus for removing the salt from seat water or for purifying brackish water. Thus far, most success has been achieved by distillation methods or apparatus or by electrodialysis methods and apparatus. However, considerable promise also exists in the process of reverse osmosis for economically providing potable water.

In order to purify salt water or brackish water by reverse osmosis, the impure water is placed in contact with a semipermeable membrane and subjected to a pressure in excess of the osmotic pressure of the impure water. For a typical concentration of salt in sea water, the osmotic pressure is on the order of 350 psig and accordingly, a pressure differential in excess of that figure must be maintained across the membrane. In this respect, it is not unusual to provide a pressure differential on the order of about 1,000 psig and accordingly, it will be apparent that the membrane requires substantial support in order to resist rupture under such substantial pressures.

Heretofore, the entire extent of the membrane, whether flat or tubular, subjected to the impure water under pressure has been supported by the wall of a pressure vessel capable of withstanding the high pressures present. Depending upon the shape of the membrane, such a wall may take the form of a plate or a tube, but in each instance the wall has been designed with sufficient thickness according to its particular geometry to withstand the extremely high pressures encountered in reverse osmosis processes. As a result, reverse osmosis purification equipment has tended to be bulky and further has required the use of a great deal of high pressure resistant material in order to provide pressure vessel walls of sufficient strength to resist the high pressures.

The former factor results in large space requirements and thus a relatively high capital investment while the latter factor similarly increases the capital investment required for a plant because of the relatively large amount of high pressure resistant material required.

SUMMARY OF THE INVENTION

The invention principally seeks to lower the cost of the equipment used in reverse osmosis processes by firstly reducing the size of a unit having a given capacity and by secondly reducing the amount of high pressure resistant material required in fabricating a support for a membrane structure. The invention accomplishes both goals by using two or more contacting membrane cells in an apparatus to support themselves when equalized pressure is applied to both cells. In order to maintain the pressure differential required for reverse osmosis to take place, a very thin layer of porous material is interposed between the membranes of the two adjacent cells and the pure water passing through the respective membranes will pass through the pores of the porous material to be collected.

In one embodiment, a plurality of membrane cells are provided and each is generally pie-shaped. The pie-shaped membrane cells are arranged in a circle to form a cylindrical configuration and a porous core is provided to support the narrow ends of each membrane cell segment. The porous core is provided with a central opening from which pure water may be taken for collection and subsequent use. The large end surfaces of the membrane cell segments are supported by any suitable imperforate material which may then be reinforced in any suitable manner, for example, by laying up fiberglass and resin thereon. As a result, only the core and the outer support must be made so as to withstand the high pressures customarily encountered in reverse osmosis processes with support for the membranes on the side of each pie-shaped segment being provided by the adjacent pie-shaped membrane cell segment which is to be operated under substantially the same pressure.

According to another embodiment, a plurality of elongated membrane cells are also provided and each is generally hexagonal in cross section. The hexagonally shaped membrane cells are arranged in a honeycomb shaped bundle and each is comprised of a hexagonal tube formed of a porous material and having a complementary shaped membrane case on its internal surface. The outer surface of each hexagonal tube may be slightly roughened or textured so that the solvent permeating the membrane may pass through each porous hexagonal tube to the interface between two or more tubes to flow therealong to a collection point. According to one embodiment, a central collection tube may be provided in the honeycomb configuration while according to another, porous spacer elements surrounding the exterior of the honeycomb shaped bundle may be provided with collection conduits.

The honeycomb configuration may be formed by assembling the tubes in a bundle and potting the ends of the bundle to form tube sheets. As will be described in greater detail hereinafter, such a construction minimizes sealing problems and permits the construction of a cartridge that may be removably inserted in a cylindrical pressure vessel capable of withstanding normal operating pressures.

As a result, space and material requirements may easily be reduced to about one-third of that required for typically constructed reverse osmosis equipment having the same water purifying ability.

DESCRIPTION OF THE DRAWINGS

FIG. 1 is a cross sectional view of one embodiment of a membrane module made according to the invention;

FIG. 2 is an enlarged, fragmentary view of a portion of the module;

FIG. 3 is a schematic illustrating how the module may be used for serial flow;

FIG. 4 is a schematic illustrating how the module may be used for parallel flow;

DESCRIPTION OF THE PREFERRED EMBODIMENTS

Figure 5:
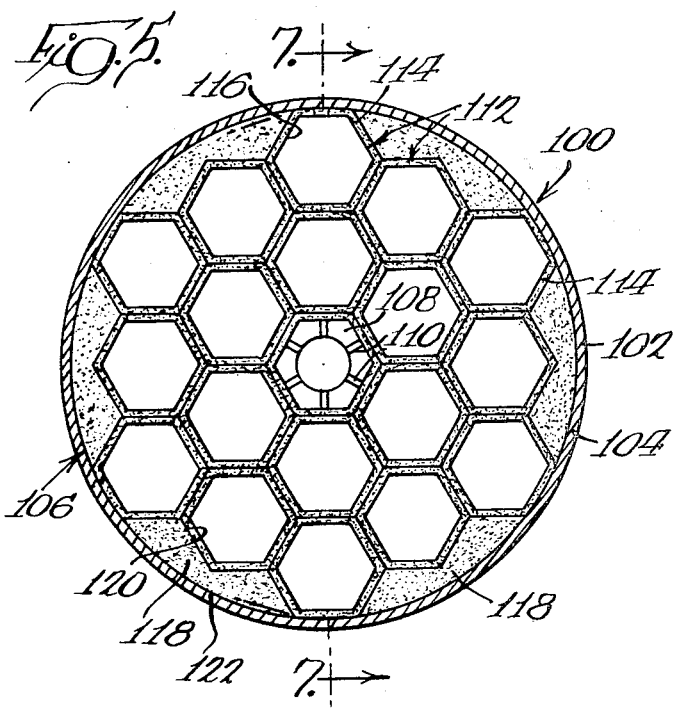
FIG. 5 is a cross sectional view of another embodiment of a membrane module made according to the invention.

One embodiment of a membrane module, generally designated 10, made according to the invention is illustrated in cross section in FIG. 1, and is seen to comprise an outer casing 12 formed of an imperforate material. The outer casing 12 may be formed of a material and have a thickness sufficient to withstand the normal operating pressures of reverse osmosis units which are in excess of the osmotic pressure of the liquid to be purified, or, if used for concentration purposes, greater than the osmotic pressure of the liquid mixture (including solutions) to be concentrated.

To strengthen the outer casing 12, there may be wound about the periphery thereof, a plurality of strands of fiberglass, generally designated 14, which may be impregnated with any suitable resin to hold them in place. The fiberglass and resin fabrication techniques are well known in many arts, and need not be discussed in detail herein.

The internal surface of the outer casing 12 is formed of a plurality of irregularities 16 which, in the exemplary embodiment of the invention, have a generally circular shape.

Centrally located within the membrane module 10 is a core 20 which is of a thickness and made of a material capable of withstanding the normal operating pressures of a reverse osmosis process. Thus, the core 20 is configured to be capable of withstanding pressures in excess of the osmotic pressure of the liquid being processed.

Centrally within the core 20 is a bore 22 which serves as a collection space for the pure liquid obtained through the reverse osmosis process, or, the liquid which may permeate membrane structures to be described in greater detail hereinafter, if the device is used for concentrating purposes.

The core 20 has on its outer surface, a plurality of irregularities 24 which, in the exemplary embodiment of the invention, are of a generally circular shape. Each irregularity is bounded by ridges 26 and, in one embodiment of the invention, small bores 28 may interconnect the points 26 with the bore 22. Alternatively, the core 20 may be formed of a porous material and if such is done, the bores 28 are unnecessary.

There are the same number of irregularities 24 in the core 20 as the number of irregularities 16 in the outer casing 12 and each serves to support respective ends of a membrane cell structure.

The membrane cell structures, generally designated 30, are generally pie-shaped with their generally circular large ends received in and supported by a respective one of the irregularities in the outer casing 12 and their generally circular short ends received in and supported by a respective one of the irregularities 24. The long sides of each membrane structure 30 are in substantial abutment and adjacent to the long sides of the adjacent membrane cell structure 30.

Each membrane cell structure includes a thin porous sheet 32 which separates the adjacent long sides of the adjacent membrane cell structure and which defines a flow path for water permeating through the membrane to the core 20 where it passes through the bores 28 to the central bore 22 for collection or through the pores of the core 20 if the latter is formed of a porous material.

Turning now to FIG. 2, it will be seen that each membrane structure 30 comprises an inner, film-like wall 34, formed of a material that is semipermeable to the liquid to be purified or the liquid in a liquid mixture to be concentrated. As is well known in the art, such membrane films 34 typically include, as a major constituent, cellulose acetate and chemically bonded water therewith.

Surrounding the membrane film 34 is the thin porous sheet 32 in the form of a tube and which may be formed of any suitable porous material, such as paper or porous plastics.

In actuality, the membrane film 34 is casted on the interior surface of the porous sheet 32 which is in the form of a tube by conventional processes using a casting bob.

In one embodiment of the invention, the outer casing 12, the core 20, and the membrane structures 30 may be formed separately and fabricated by properly orienting the core 20 with respect to the casing 12 so that the membrane structure 30 may be interposed between the core 20 and the casing 12. Alternatively, using known dissimilar material extruding techniques, the core 20 and thin porous sheet 30 may be extruded of a porous material simultaneously with the extrusion of the imperforate non-porous outer casing 12 to result in a unitary structure. In such cases, after the unitary module is formed, the membrane film 34 may be cast on the thin porous sheets 32 in the same manner mentioned previously.

From the foregoing, it will be appreciated that the presence of the thin, porous sheet 32 which is in the form of a tube surrounding the film-like membrane 34 provides a flow path about the entire periphery of the film-like membrane wall 34 so that water diffusing therethrough may flow to the core 20 to be collected in the bore 22. As a result, all of the surface of the membrane 34 is used.

Because, in the exemplary embodiment, each membrane cell structure 30 is provided with a tubular thin, porous sheet 32, at each interface, there will be two layers of the thin, porous sheet 32. However, if the extrusion techniques mentioned previously are used, only one such layer need be present. The only characteristics required of the thin porous sheet 32 are that it be somewhat rigid to aid in the installation thereof, that it be porous to provide desired flow path and that it be of such a nature that the pores thereof will not close when subjected to the operating pressures of a reverse osmosis unit. The materials mentioned previously, namely, paper and porous plastics, will fill these requirements. It is also of note that very little thickness is required of the thin porous sheet 32 and the same may be a small fraction of an inch. For example, a wall thickness of about 0.017 inch is satisfactory.

It will be appreciated that with substantially equal pressures being applied in each of the membrane cells 30, and with the long side thereof being in abutment with the long side of the adjacent membranes, the relatively thin walls dividing the cells will be subjected to substantially equal and opposite balancing forces on opposite sides thereof thereby eliminating any tendency to rupture. And since the vast majority of the membrane surface of each cell lies along the long walls thereof, which in prior art devices would require substantial reinforcement to withstand the high pressures customarily encountered, a substantial saving in the amount of high pressure resistant material required is obtained. Similarly, because much of the high pressure resistant material previously required according to prior art structures is eliminated, the overall membrane module 10 is of significantly lesser size than corresponding prior art devices capable of operating under the same circumstances to produce the same amount of pure liquid within a given time.

Furthermore, the nature of the module is such that it may be readily adapted to any desired flow path. FIG. 3 illustrates, in schematic form, how the module 10 may be used to provide a serial flow path. The ends of the module 10 are closed by end caps 40 and 42 each of which is formed with a plurality of redirecting channels 44 therein for directing liquid passing through each membrane cell in an opposite direction to the adjacent membrane cell.

The end caps 40 and 42 may be secured to the membrane module 10 by any suitable means and the channels 44 sealed to corresponding membrane cells 30. Suitable sealing techniques are disclosed in my copending application entitled "Reverse Osmosis Desalination Equipment," Ser. No. 678,039, filed Oct. 25, 1967, and now abandoned, and assigned to the same assignee as the instant application, the details of which are herein incorporated by reference.

Additionally, the end cap 40 is provided with a channel 46 which communicates with the bore 22 in the core 20 so that the liquid permeating the membranes 34 may be conveyed to a point of use. Similarly, the end cap 42 includes a first channel 48 which communicates with one of the membrane cells 30 and through which the feed liquid may be introduced. Finally, there is provided a second channel 50 on the end cap 42 from which the concentrated liquid may be withdrawn.

FIG. 4 illustrates an alternative arrangement wherein the membrane module 10 may be used with parallel flow of the feed. Again, the ends of the membrane module 10 are sealed by end caps 52 and 54 with the end cap 52 including a plurality of interconnected channels 56 which communicate with one end of each of the membrane cells 30. A channel 58 communicates with the channels 56 so that the concentrated liquid may be withdrawn. Finally, the end cap 52 is provided with an outlet channel 60 from which the liquid passing through the membranes may be collected.

The end cap 54 includes a single channel inlet 62 in which the feed liquid may be introduced and the same is divided into a plurality of communicating channels 64 which communicates with the other end of each membrane cell 30 so as to direct the feed to each such cell.

Thus, it will be seen that the membrane module 10 made according to the invention is susceptible to use in both serial and parallel flow devices. Of course, the invention contemplates that a single module 10 may be used with both serial and parallel flow paths if desired and appropriate modifications of the channels within the end caps used are believed to be well known in the skill of those acquainted with the art.

Another embodiment of a membrane module, generally designated 100, made according to the invention is illustrated in cross section in FIG. 5 and is seen to comprise an outer casing 102 formed of an imperforate material. The outer casing 102 may be formed of a material and have a thickness sufficient to withstand the normal operating pressures of reverse osmosis units which are in excess of the osmotic pressure of the liquid to be purified or, if used for concentration purposes, greater than the osmotic pressure of the liquid mixture or solution to be concentrated.

To strengthen the outer casing 102, there may be wound about the periphery thereof, a plurality of strands of fiberglass, generally designated 104 which may be impregnated with any suitable resin to hold them in place in the same manner as the outer casing 12 shown in FIG. 1.

The internal surface of the outer casing 102 is preferably circular in cross section to removably receive a membrane cartridge, generally designated 106.

According to the preferred modification of the embodiment shown in FIG. 5, the cartridge 106 includes a central product collection tube 108 that is capable of withstanding normal operating pressures of the unit. Interconnecting the exterior of the hexagonal collection tube 108 and the interior thereof are a plurality of radial bores 110 which permit the purified liquid in the liquid mixture to pass into the center of the collection tube 108 for collection purposes. As an alternative to the use of the bores 110, the tube 108 may be formed of a porous material through which the purified liquid may permeate to the center of the tube.

The cartridge 106 further includes a plurality of elongated, hexagonally shaped membrane cells 112 which are fitted together to define a honeycomb configuration. Each of the membrane cells 112 is formed of a thin walled porous tube 114 and an inner semipermeable membrane film 116 bonded to the porous tube 114 as by casting thereon. The porous tube 114 should be extremely thin walled to minimize space requirements and therefore will be incapable of withstanding the pressures normally present in the unit when operating. The primary requisites of the same are that it have a high compressive strength, i.e., its compressibility is less than 10 percent at 1,000 pounds per square inch, has slight ductility and is not too brittle, the pores therein are defined by a plurality of interconnecting voids, and the material itself is incapable of withstanding the customary temperatures employed in curing membranes without distortion. Acrylonitrile butadiene styrene copolymer or polycarbonate plastics or polymerized alloys of the two may be employed with success in fabricating the tubes 114.

Figure 6:
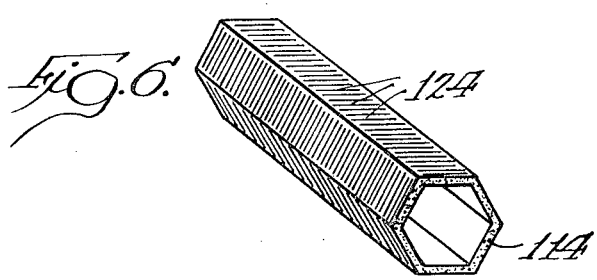
FIG. 6 is a perspective view of a membrane cell employed in the embodiment illustrated in FIG. 5.

The configuration of the inner surface of the tube 114, and thus the membrane film 116, may be any desired shape. For example, the same may be hexagonal as illustrated in FIGS. 5 and 6 or could be a variety of other shapes such as circular. Generally, it is desirable that the inner surface have the same cross sectional shape as the outer surface to maximize the area of membrane film 116 that may be received in a tube having a given minimal wall thickness.

The cartridge structure is completed by filler wedges 118 or the like which surround a goodly portion of the honeycomb configured bundle and have inner edges 120 designed to abut the outer surfaces of one or more of the tubes 114 and outer surfaces 122 that conform to the interior surface of the casing 102.

As a result of the foregoing, when a liquid to be processed is placed under a pressure in excess of its osmotic pressure and within the cells 112, the solvent of the liquid mixture will permeate the membranes 116 of each cell 112 and flow through the porous outer tube 114 to the collection tube 108 from which it may be taken for further use or disposed of depending upon whether the unit is being used for purification purposes or for concentration purposes.

During operation such as mentioned in the preceding paragraph, the thin walled tubes 114 will not burst even through they are incapable of withstanding the operating pressures. In particular, the tubes 114 support each other inasmuch as they are in contact with one another and the adjacent cells have substantially equal internal pressures which therefore balance out. Of course, those portions of the tubes 114 are either in contact with the wedges 118 or the collection tube 108 which provide the necessary pressure resistant support for such portions.

In order to enhance the flow of liquid permeating the membrane cells 112 to the collection tube 108, the outer surfaces of each of the porous tubes 114 are textured as indicated at 124. That is, the outer surfaces are provided with a slight roughness which, for example, may be in the form of scratch marks imparted thereto as by a wire brush in a direction generally transverse to the length of the tube. Of course other texturing techniques may be employed. In any event, the extremely small voids which are insignificant as regards the ability of the tubes 114 to withstand operating pressures when supported by the adjacent cell 112 or the center tube 108 of the casing 102 allow the liquid permeating the membrane to flow with little resistance to the collection point.

Figure 7:
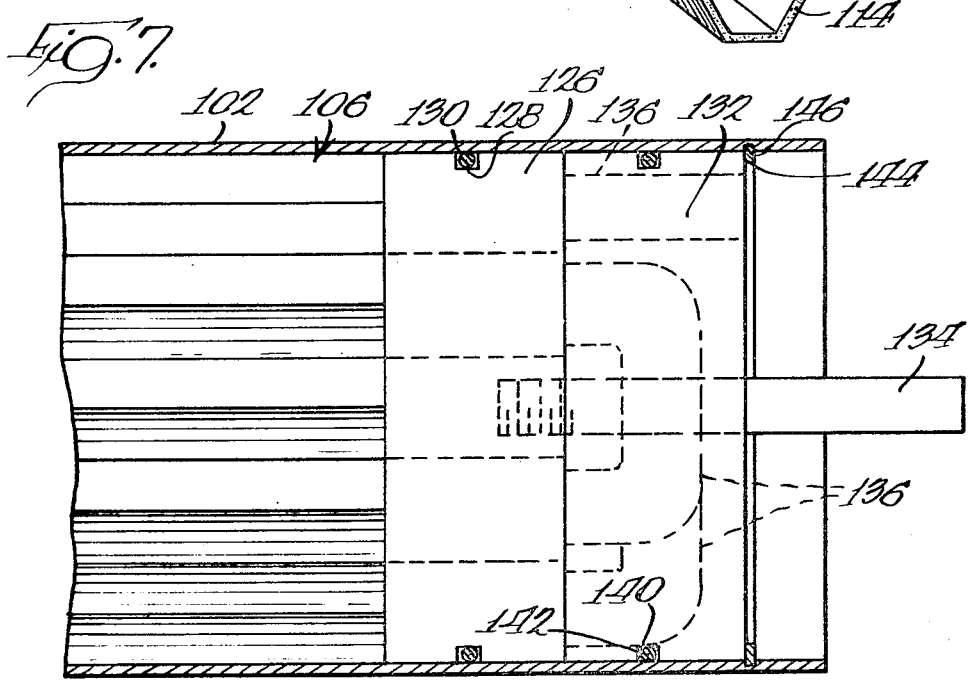
FIG. 7 is a side elevation of the membrane module shown in FIG. 5 with parts broken away for clarity.

The cartridge 106 may be formed as follows. A plurality of the tubes 114 may be assembled in the honeycomb configuration illustrated in FIG. 5 with the end of each individual tube 114 having its ends plugged. The ends of the resulting bundle may then be potted in a strong plastic such as an epoxy resin or the like to form a solid plastic tube sheet 126. The same may be cast in such a way as to have an external diameter approximately equal to the internal diameter of the casing 102 and provided with a peripheral grove 128 which in turn may receive an O-ring 130 to seal the same against the internal surface of the casing 102. The wedges 118 may then be applied to the structure. As an alternate method of fabrication, the entire honeycomb structure, with or without the wedges 118, may be extruded as a single unit. In such a case, rather than potting the ends of the bundle, the same need only be made liquid impervious as by coating with a suitable plastic. The cartridge 106 is then completed by a pair of end caps 132 (only one of which is shown) which may be secured to the tube sheet 126 by any suitable means. The end cap 132 may also be formed of cast or molded plastic and as illustrated in FIG. 7, includes a central outlet tube 134 having an end 136 threadedly received in the interior of the collection tube 108. Also included in the end cap 132 is an inlet channel 136 and a plurality of redirecting channels 138 to provide for fluid communication between the various ones of the cells 112. The end cap 132 may also be provided with a peripheral groove 140 receiving an O-ring 142 to seal the same against the internal surface of the outer casing 102. As an alternate construction, partial grooves may be cut in both the tube sheet 126 and the end cap 132 at the interface of the two to receive but a single O-ring for sealing purposes. The entire assemblage may be retained within the casing 102 by means of a locking ring 144 abutting the exterior of the end cap 132 and received within an internal groove 146 in the inner surface of the casing 102 near the end thereof.

As a result of the foregoing construction, when a cartridge 106 has served its usefulness, it is only necessary to remove the locking ring 144 and remove the same from the casing 102 whereupon another cartridge 106 may be inserted and held in place by replacement of the locking ring 144. Connections to the inlets and outlets 134 and 136 may be made in any suitable manner.

Figure 8:
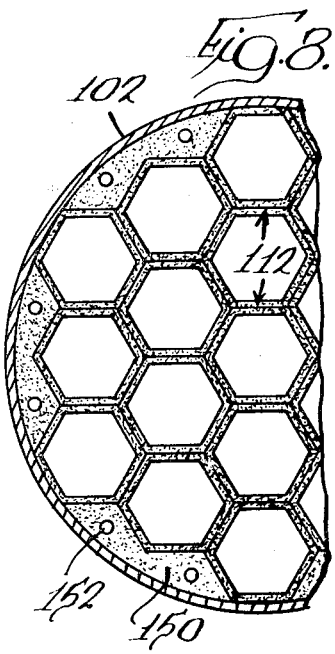
FIG. 8 illustrates one modification of the module illustrated in FIG. 5.

If desired, the central collection tube 108 may be omitted in favor of another membrane cell as illustrated in FIG. 8. In such a case, the wedges 118 are replaced with wedges 150 of a porous character. Each wedge 150 may be provided with one or more collection bores 152 from which the product liquid may be collected. For example, the same could communicate with fine grooves either in the interior of the casing or on the exterior of the bundle which in turn would be in fluid communication with a suitable outlet from the casing 102.

It will be appreciated that the embodiment shown in FIGS. 5–8 has a number of advantages over other module constructions heretofore known. For example, sealing difficulties are minimized through the use of the potted tube sheet 126 which permits the elimination of all seals between individual cells and the end cap 132. Those skilled in the art will immediately recognize that the elimination of such seals effect a substantial saving now both in the cost of parts and in the cost of labor, in the fabrication of a reverse osmosis membrane unit.

Figure 9:
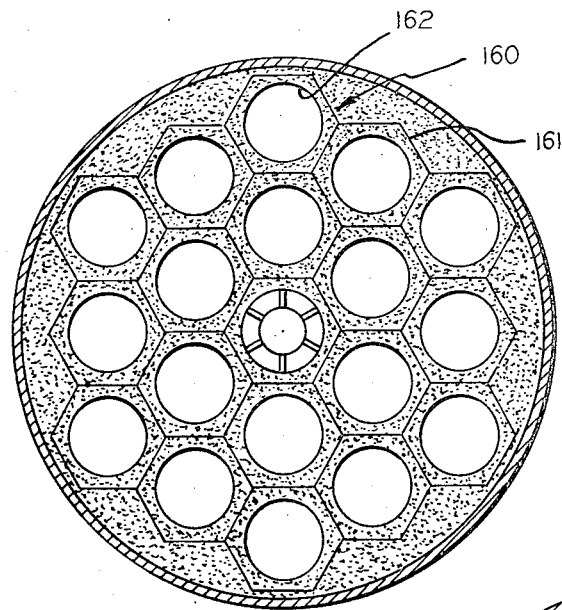
FIG. 9 illustrates an alternate embodiment of the invention.

FIG. 9 shows an alternate embodiment of the invention wherein the individual membrane cells 159 are formed of individual tubes 160 each shown to have an outer surface 161 which is hexagonal in a plane normal to its longitudinal axis. In addition, the inner surface of the tubes 160 are cylindrical for carrying a semipermeable membrane which is bonded to it in any suitable manner. The tubes 160 are formed of a porous material and are interfitted in a honeycomb structure and surrounded by an outer housing 163. Further the outer surfaces of the individual tubes 160 may be textured for collecting permeate as discussed with respect to the embodiment in FIGS. 5–8.

Figure 10:
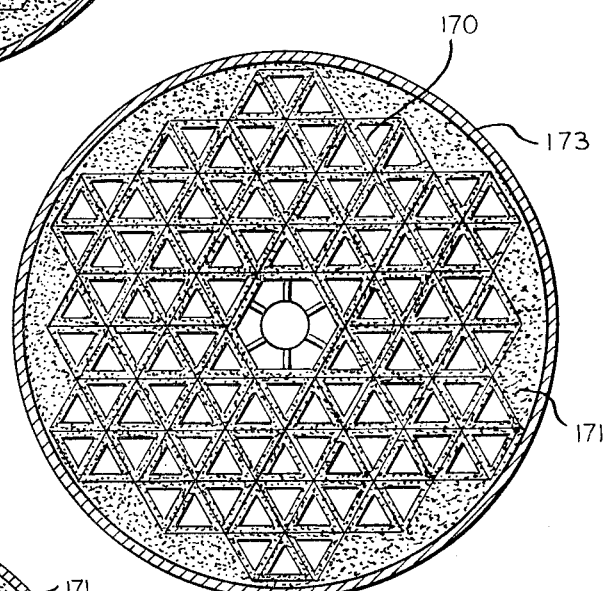
FIG. 10 illustrates another embodiment of the invention.
Figure 11:
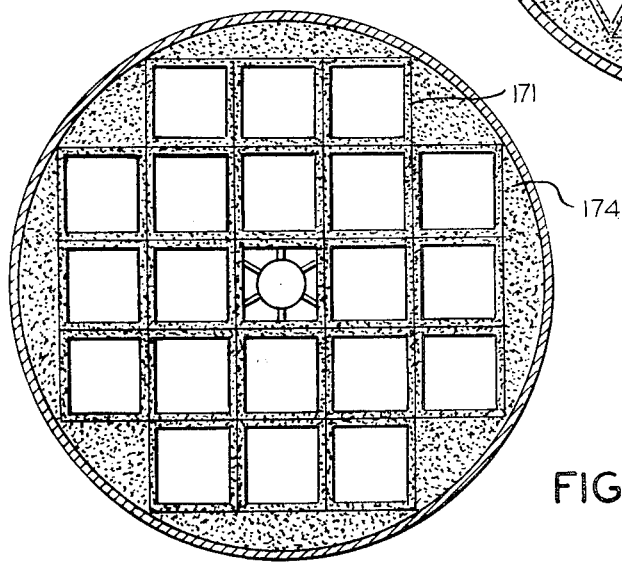
FIG. 11 illustrates yet a further embodiment of the invention.

The individual tubes forming the cells of the membrane module according to the invention may have any convenient shape which will permit them to be interfitted to form a mutually supporting cellular structure. This is possible where the sum of the angles of the intersections of abutting surfaces of adjacent cells equals 360° so that each wall of the individual cell will engage a supporting surface of an adjacent cell. For example, in addition to the hexagonally configured cells illustrated in FIGS. 1–9, the individual membrane cells may be configured in cross section as an equilateral triangle such as the cells 170 in FIG. 10 or as rectangles such as the cell 171 in FIG. 11. In the embodiment of FIG.

10, wedges 172 are disposed between the cellular structure formed by the cells 170 in the housing 173. Similarly a wedge would also be provided around the outer cells 171 of FIG. 11. This supporting structure could be fabricated in any suitable manner configured to support the particular cell configuration.

While the invention has been described primarily in conjunction with water purification, those skilled in the art will recognize that it has substantial utility in other purification or concentration processes.

Furthermore, while the second embodiment has been illustrated and described as being comprised of a plurality of hexagonally shaped cells, the principles of the invention are equally applicable to other geometrically discontinuous shapes such as triangles, quadrilaterals, etc., interfitting as in a honeycomb, but of course, not limited to hexagons as the term honecomb may sometimes imply it only being necessary that when the tubes forming the cells are made individually, that they are shaped so that they can be assembled into a bundle in the manner of a honeycomb wherein all portions of the exterior walls of each tube are in contact with an adjacent tube, the central collection tube, outer wedges, or the outer support casing, as the case may be.

I claim:

1. A membrane module for use in purifying a concentrated liquid mixture by reverse osmosis comprising: means defining a plurality of elongated, open centered, closed periphery membrane cells having a hexagonal cross sectional configuration, each cell having a film-like wall formed of a material semipermeable to the liquid in the liquid mixture and adapted to receive the liquid mixture under pressure in excess of the osmotic pressure of the liquid mixture, said plurality of membrane cells being arranged with respect to each other such that the film-like wall of one cell is adjacent to the film-like wall of the adjacent cell whereby the pressures across adjacent cells balance out obviating the need for support means for the film-like walls, and further including porous means interposed between and in contact with adjacent film-like walls of adjacent membrane cells, said porous means being incapable of withstanding high pressure; support means capable of withstanding high pressure in contact with and supporting those portions of each membrane cell not adjacent to the film-like wall of an adjacent cell; means for directing a liquid mixture to the interior of each membrane cell and for providing a flow path therethrough along the length thereof; and liquid receiving means associated with said porous means to receive the liquid permeating through the film-like wall of each membrane cell to the porous means.

2. The membrane module of claim 1 wherein said plurality of membrane cells are arranged with respect to each other in the form of a honeycomb shape.

3. A membrane module for use in purifying or concentrating liquid mixtures by reverse osmosis comprising: means defining a multiple honeycomb structure formed of a porous material incapable of withstanding high pressures; means defining a plurality of elongated, open centered, closed periphery membrane cells having a hexagonal cross-sectional configuration, each cell having a film-like wall formed of material semipermeable to the liquid in the liquid mixture and adapted to receive the liquid mixture under pressures in excess of the osmotic pressure of the liquid mixture, each said cell being disposed in a corresponding one of the cells of the honeycomb structure and in contact with the interior wall thereof; support means capable of withstanding high pressures surrounding the exterior of said honeycomb structure to support the same; means for directing a liquid mixture to the interior of each membrane cell and for providing a flow path along the length thereof; and liquid receiving means associated with the honeycomb structure to receive the liquid permeating through the film-like wall of each membrane cell to the porous material of the honeycomb structure.

4. The membrane module of claim 3 wherein the honeycomb structure is removably received within the support means.

5. The membrane module of claim 3 wherein the honeycomb structure is formed of a plurality of porous tubes each having an outer, hexagonal cross section.

6. The membrane module for use in purifying or concentrating liquid mixtures by reverse osmosis comprising: means defining a multiple cell honeycomb structure formed of a porous material incapable of withstanding high pressures; means defining a plurality of elongated, open centered, closed periphery membrane cells, each having a film-like wall formed of material semipermeable to the liquid in the liquid mixture and adapted to receive the liquid mixture under pressures in excess of the osmotic pressure of the liquid mixture, each said cell being disposed in a corresponding one of the cells of the honeycomb structure and in contact with the interior wall thereof; support means capable of withstanding high pressures surrounding the exterior of said honeycomb structure to support the same; means for directing a liquid mixture to the interior of each membrane cell and for providing a flow path along the length thereof; and liquid receiving means associated with the honeycomb structure to receive the liquid permeating through the film-like wall of each membrane cell to the porous material of the honeycomb structure; said honeycomb structure being defined by a plurality of porous tubes held together in abutment.

7. The membrane module of claim 6 wherein the external surface of each of said tubes is textured.

8. The membrane module of claim 6 wherein said honeycomb structure is held together by tube sheets and removably received within said support means and further including removable end caps at each end of said honeycomb structure releasably secured within said support means in abutment with a corresponding one of said tube sheets.

9. A membrane module for use in separating dissolved substances from liquid by reverse osmosis comprising:
   a. a plurality of elongated, adjacent, open-centered, peripherally closed cells each of which is hexagonal in cross-section and has walls comprised of porous material that is incapable of withstanding high pressures, rupture of said cell walls which are adjacent being prevented by fluid pressure in the cells being in substantial equilibrium with each other,
   b. a peripherally closed semi-permeable membrane disposed on the respective interior surfaces of said cell walls and adapted to receive a liquid under high pressure in excess of its osmotic pressure,
   c. support means capable of withstanding high pressure surrounding the exterior or said plurality of cells to support the same and prevent rupture of those cell walls which are not adjacent each other, d. means for directing a liquid under pressure to the interior of each membrane, and e. liquid receiving means adapted to receive liquid that has permeated said membrane and said porous material.

10. The membrane module of claim 9, wherein the said plurality of cells are removably disposed within the support means.

11. The membrane module of claim 9 wherein the said plurality of porous cells are held together contiguously with each other by tube sheets of a cast plastic material.

12. The membrane module of claim 11 wherein said plurality of cells are unitarily removably disposed within said support means and further including removable end caps at each end of said cell releaseably secured within said support means in abutment with a corresponding one of said tube sheets.

13. The membrane module of claim 9 wherein the cells constituting said plurality of cells are individually formed and have their external contacting surfaces textured to augment conductivity of fluid that has permeated the porous cell walls.

14. A membrane module for use in purifying a liquid by reverse osmosis comprising porous means defining a plurality of elongated, open centered, closed periphery membrane cells, each cell having an outer surface which is polygonal in cross-section, said cells interfitting as in a honeycomb structure, a plurality of said cells being arranged with each of its sides in abutment with a wall of an adjacent cell, said cell being composed of a porous material which is incapable of withstanding high pressure, each of said cells having an inner surface, a film of a material disposed on said inner surface and being semipermeable to the liquid to be purified, means for directing a liquid mixture to the interior of each membrane cell under pressure in excess of the osmotic pressure of the liquid mixture, the walls of said cell-like structure which define the margins of adjacent cells having a pressure thereacross balanced out obviating the need for support means for said walls, support means capable of withstanding high pressure in contact with and supporting those walls of each of said cells not engaged by the wall of an adjacent cell, and liquid receiving means associated with said porous means to receive the liquid permeating through the semipermeable membrane to the porous wall structure.

15. The membrane module of claim 14 wherein the polygonal cross-section is a hexagon, said plurality of membrane cells being arranged with respect to each other in the form of a honeycomb.

16. The module set forth in claim 14 wherein said polygonal cross-section is an equilateral triangle.

17. The module set forth in claim 14 wherein said polygonal cross-section is a rectangle.

18. The reverse osmosis membrane module set forth in claim 14 wherein the sum of the angles formed by the intersections of the walls of adjacent cells at the point of such intersection being equal to 360°.

19. The module set forth in claim 14 wherein said module is formed of a plurality of porous tubes each having an outer polygonal cross-section.

20. The module set forth in claim 19 wherein the internal surface of said tubes is generally circular in cross-section.

* * * * *